(12) United States Patent
Beulich et al.

(10) Patent No.: US 7,256,560 B2
(45) Date of Patent: Aug. 14, 2007

(54) CIRCUIT ARRANGEMENT FOR SUPPLYING A CONTROL ELECTRONICS SYSTEM IN ELECTRIC MACHINES

(75) Inventors: Klaus Beulich, Sachsenheim (DE); Michael Pesch, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/513,566

(22) PCT Filed: Jan. 31, 2003

(86) PCT No.: PCT/DE03/00271
§ 371 (c)(1),
(2), (4) Date: Jul. 6, 2005

(87) PCT Pub. No.: WO03/094336
PCT Pub. Date: Nov. 13, 2003

(65) Prior Publication Data
US 2005/0264246 A1 Dec. 1, 2005

(30) Foreign Application Priority Data
May 3, 2002 (DE) ................. 102 19 820

(51) Int. Cl.
*H02K 23/00* (2006.01)
(52) U.S. Cl. .................... 318/254; 318/138
(58) Field of Classification Search ........... None
See application file for complete search history.

(56) References Cited

U.S. PATENT DOCUMENTS

| | | | | |
|---|---|---|---|---|
| 4,445,167 A | | 4/1984 | Okado | |
| 4,742,441 A | * | 5/1988 | Akerson | 363/97 |
| 5,642,025 A | * | 6/1997 | Konstanzer et al. | 318/778 |
| 5,909,360 A | * | 6/1999 | Lavin et al. | 307/66 |
| 6,040,561 A | * | 3/2000 | Murty | 219/494 |
| 6,094,017 A | * | 7/2000 | Adamson | 315/307 |
| 6,208,540 B1 | * | 3/2001 | O'Meara et al. | 363/98 |
| 6,384,559 B2 | * | 5/2002 | Egami | 318/500 |
| 6,469,469 B1 | * | 10/2002 | Chambers et al. | 318/801 |
| 6,611,443 B2 | * | 8/2003 | Gaudreau | 363/125 |
| 6,664,748 B2 | * | 12/2003 | Kushida et al. | 318/139 |
| 6,828,919 B1 | * | 12/2004 | Gold | 340/870.29 |
| 6,836,416 B2 | * | 12/2004 | Ishihara et al. | 363/132 |
| 6,940,249 B2 | * | 9/2005 | Toyoda | 318/700 |

FOREIGN PATENT DOCUMENTS

| | | |
|---|---|---|
| DE | 197 33 212 | 2/1999 |
| JP | 2001 352681 | 12/2001 |

* cited by examiner

Primary Examiner—Lincoln Donovan
Assistant Examiner—Renata McCloud
(74) Attorney, Agent, or Firm—Kenyon & Kenyon LLP

(57) ABSTRACT

A circuit configuration for supplying the control electronics in an electrical machine is specified, which includes a passive transformer circuit, which is powered by a phase current IP of the electrical machine and which generates an auxiliary voltage VA that is used for supplying the output stage of the electrical machine if no battery is present or if the battery is defective or discharged.

6 Claims, 1 Drawing Sheet

US 7,256,560 B2

CIRCUIT ARRANGEMENT FOR SUPPLYING A CONTROL ELECTRONICS SYSTEM IN ELECTRIC MACHINES

FIELD OF THE INVENTION

The present invention is based on a circuit configuration for supplying the control electronics of electrical machines and relates in particular to supply circuits for starter-generators in motor vehicles which can also be operated without battery.

BACKGROUND INFORMATION

Usually, two electrical machines are used in motor vehicles, a generator, which is driven by the engine of the motor vehicle and which generates electrical energy for supplying the electrical-system consumers and for charging the battery, and a starter, which works as a battery-powered electrical motor and which, in the event of a starting operation, brings the engine of the motor vehicle up to a required minimum rotational speed. Also known, however, are systems featuring a single electrical machine, which takes the form of a starter-generator and which accomplishes both the starting of the engine as well as the generation of the electrical energy.

Such starter-generators are, for example, flywheel starter-generators or crankshaft starter-generators directly connected to the crankshaft of the engine. The starter-generators used in this context are three-phase machines, which can be connected to the vehicle battery via a power electronics that includes a controlled rectifier bridge, in particular a pulse-controlled a.c. converter with a pulse-controlled inverter bridge. The pulse-controlled inverters are controlled using a control electronics.

If the electrical machine, for example, is a permanent-field synchronous machine, then the rotating machine will generate a voltage regardless of whether the electronics is activated or not. In the case of sufficiently high rotational speeds of the synchronous machines this can lead to an exceeding of the permitted voltage and there is the danger of destroying the electronics of the starter-generator as well as the electrical system electronics.

A vehicle electrical system having a starter-generator as well as a method for the automatic control of such a starter-generator, which can be connected to the vehicle battery via a pulse-controlled inverter bridge, is described in German Published Patent Application No. 197 33 212 for example. In this known system, the pulse-controlled inverter elements of the converter bridge are suitably controlled with the aid of a control electronics in such a way that an optimal generator control is achieved in generator operation and hence a maximum of electrical power is generated. At the same time, a suitable control of the pulse-controlled inverter elements ensures that in a starting operation the electrical machine can draw electrical power from the battery and thereby working as a motor can accelerate the vehicle engine to the rotational speed required for starting.

Since it is possible that the vehicle battery is destroyed during the operation of the vehicle or that the battery is largely drained due to unfavorable circumstances, there is the danger that in the resulting so-called batteryless operation, the electronics of the electrical machine is no longer supplied. In this case, when the machine is short-circuited and rotating, there exists no intermediate circuit voltage which could supply the control electronics. Hence there is the danger that, if the control electronics is not supplied, the short-circuiting of the machine cannot be maintained. The consequence would be an uncontrolled rise of the voltage. This could lead to destruction in the electronics of the electrical machine or of the starter-generator and in the vehicle electrical system itself.

SUMMARY OF THE INVENTION

An objective of the present invention, therefore, is to ensure the supply of the electronics of an electrical machine, particularly of a starter-generator, in the event of an operation without battery and with a short-circuited, rotating machine.

The circuit configuration of the present invention for supplying the control electronics of electrical machines, particularly in starter-generators, has the advantage that the voltage supply for the control electronics is ensured also in operation without battery and with a short-circuited, rotating machine. This advantage is achieved by using a passive transformer circuit powered by the phase current of the electrical machine. This passive transformer circuit additionally has the special advantages of a low circuit complexity and only requires few component parts.

Particularly advantageous is the fact that as a matter of principle no closed-circuit current flows for supplying the circuit and that the circuit can be switched off. These further advantages are achieved by the measures indicated in the subordinate claims.

BRIEF DESCRIPTION OF THE DRAWINGS

Exemplary embodiments of the present invention are depicted in the drawing and will be explained in greater detail in the following description. The individual figures show.

DETAILED DESCRIPTION

Figure 1:
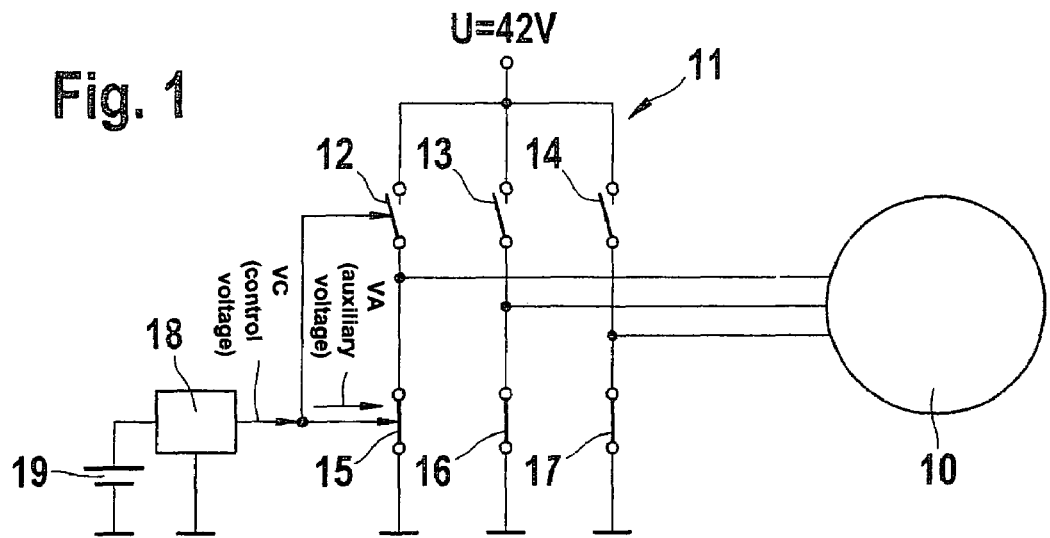
FIG. 1 shows an electrical machine having a controlled bridge with short-circuited low-side switches.

FIG. 1 shows a rough schematic representation of a voltage supply circuit for an electric machine 10, in which d.c. voltage is supplied to electrical machine 10 via a switchable bridge 11. The switchable bridge here includes three high-side switch elements 12, 13, 14 and three low-side switch elements 15, 16, 17, for example field-effect transistors (MOSFETs) or appropriate pulse-controlled inverter elements etc. and carries on the side opposite to ground a voltage U of 42 volts for example. The electrical machine 10 is connected in the usual manner to the controlled rectifier bridge. The windings of the electrical machine 10 are not represented in FIG. 1.

The switch elements of the rectifier bridge are suitably controlled by a control electronics 18. The voltage for control electronics 18 is supplied in normal operation from battery 19, via suitable voltage converters if necessary. In the short-circuit case represented in FIG. 1, low-side switch elements 15, 16, 17 are controlled (short-circuited) in such a way that they form a conductive connection to ground. For such a control to be possible, a voltage has to be applied at the gate of the low-side switch, which, according to the invention, is formed, in case of a missing battery, from the phase current of the electrical machine. This voltage is called auxiliary voltage VA and is fed to switch elements 15, 16, 17 in place of the control voltage VC normally supplied by control electronics 18.

Figure 2:
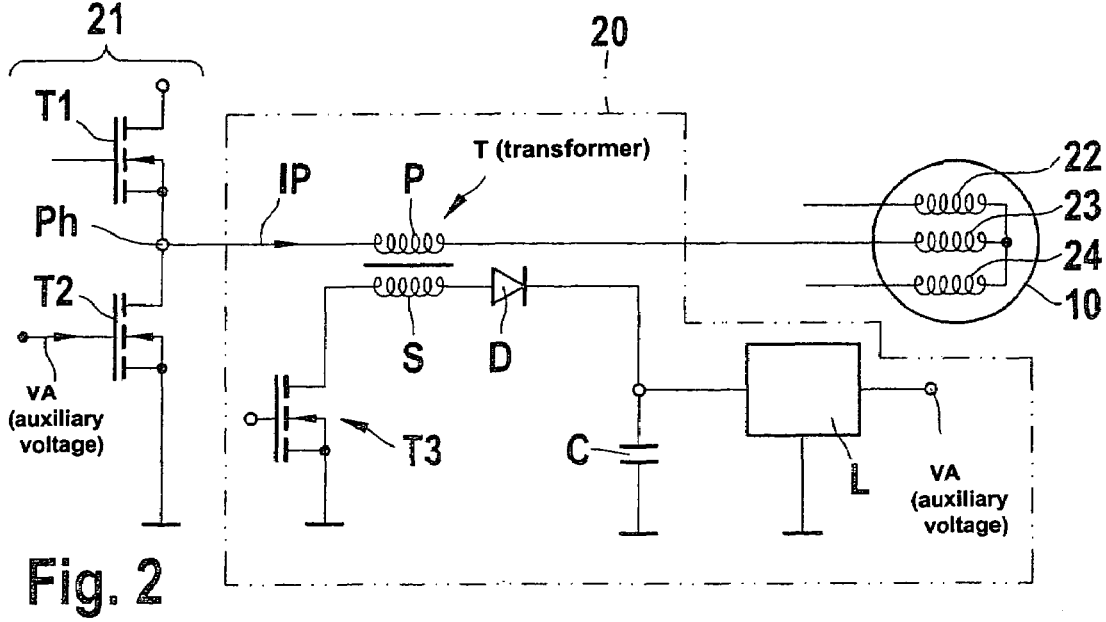
FIG. 2 shows a circuit configuration according to the present invention for supplying the control electronics in electrical machines.

FIG. 2 shows a detailed circuit configuration for supplying the control electronics in electrical machines or for forming an auxiliary voltage VA, which features a transformer circuit 20 as an essential component. Electrical machine 10 includes three phase windings 22, 23, 24 and is connected to an output stage 21 via this transformer circuit 20. Output stage 21 corresponds, for example, to controlled bridge 11 in FIG. 1, although only the two transistors T1 and T2 for a phase winding of the electrical machine are represented.

The connecting point between the two transistors T1 and T2, that is, the phase connection Ph, is connected via the transformer T to the corresponding phase winding, for example phase winding 23 of electrical machine 10. In addition to the electrically isolated transformer T having primary winding P and secondary winding S, transformer circuit 20 also includes a diode D, a capacitor C and a transistor T3 as well as a linear regulator L.

In the case of a short circuit, low-side switches 15, 16, 17 according to FIG. 1 or transistor T2 according to FIG. 2 are controlled, i.e. supplied with voltage, in such a way that a voltage is applied at the gate of the respective transistor. The relevant transistor is then in a conductive state. A nearly sinusoidal current IP flows across the primary side of transformer T. A corresponding a.c. voltage is thereby induced in the secondary side of transformer T. This a.c. current is rectified via diode D and capacitor C. The rectified voltage is fed to linear regulator L, which stabilizes the voltage and provides at its output the stabilized auxiliary voltage VA.

With the aid of transistor T3, which is normally switched on (normally-on transistor), transformer circuit 20 can be switched off when it is not required, if certain suitable, specifiable conditions obtain, with no closed-circuit current flowing as a result.

Figure 3:
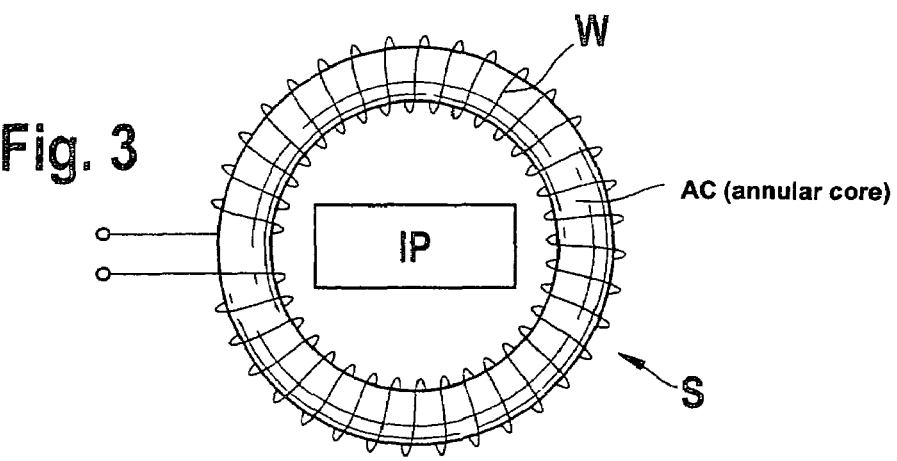
FIG. 3 shows an example of a transformer design.

Transformer T may be designed, for example, as an annular core AC. Phase current IP of the primary side is then conducted through the center hole of annular core AC. The windings W of secondary side S are wound around annular core AC. FIG. 3 shows a possible refinement of transformer T.

What is claimed is:

1. A circuit configuration for supplying electrical energy to control electronics for an electrical machine whose phase windings are connected to an output stage having controlled switches, comprising:
    a transformer circuit arranged between the output stage and the electrical machine, the transformer circuit being fed a phase current of the electrical machine, whereby an auxiliary voltage is produced from the phase current, the auxiliary voltage being used under specifiable conditions to supply low-side switches of the output stage; and
    a controllable switch element according to which a secondary side of the transformer switches on or off under specifiable conditions which include at least one missing or defective or discharged battery;
    wherein the transformer circuit includes a transformer, a primary side of the transformer is connected to a phase winding of the electrical machine.

2. The circuit configuration as recited in claim 1, wherein:
    the controllable switch element includes a normally-on transistor.

3. The circuit configuration as recited in claim 1, further comprising:
    a linear regulator connected downstream of the transformer circuit, wherein the linear regulator is fed a rectified voltage of a secondary winding of the transformer.

4. The circuit configuration as recited in claim 1, further comprising:
    a diode and a capacitor allocated to a secondary winding of the transformer.

5. The circuit configuration as recited in claim 1, wherein:
    the transformer includes an annular core, the phase current is conducted through a center hole, and windings of a secondary side of the transformer are wound around the annular core.

6. The circuit configuration as recited in claim 1, wherein the electrical machine includes a starter-generator.

* * * * *